Jan. 28, 1936.                C. G. BRIEL                2,028,863
              METHOD OF PRODUCING COMPOSITE PICTURES
                  Filed Oct. 12, 1931        2 Sheets-Sheet 1
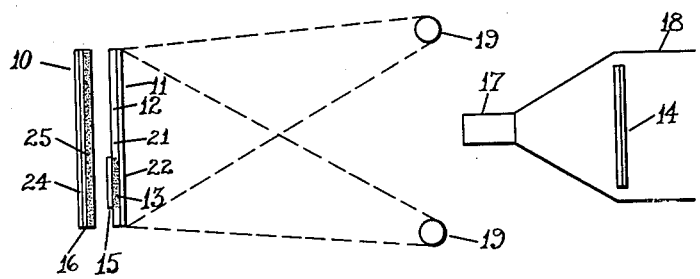
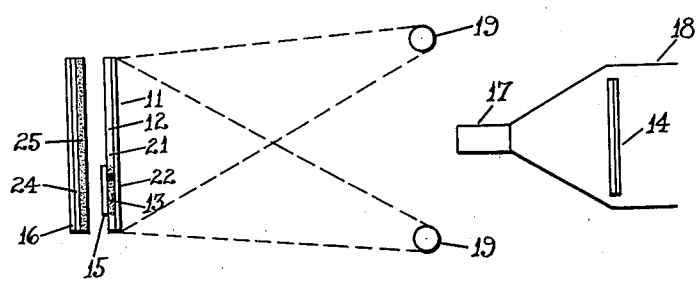
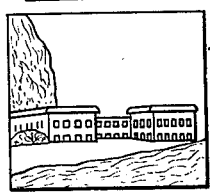 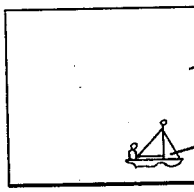 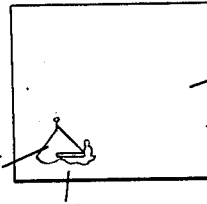 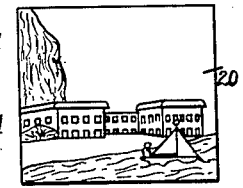
INVENTOR
Conrad G. Briel
Jones, Addington, Ames & Seibold
ATTORNEYS

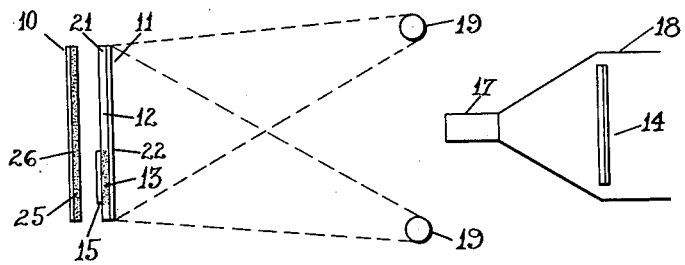
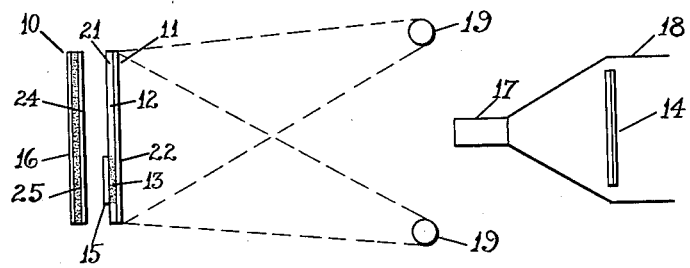
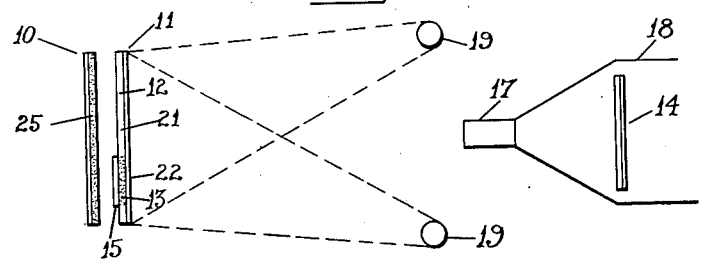

Patented Jan. 28, 1936

2,028,863

UNITED STATES PATENT OFFICE 2,028,863

METHOD OF PRODUCING COMPOSITE PICTURES

Conrad G. Briel, Chicago, Ill., assignor to Cinema Development Company, Chicago, Ill., a corporation of Illinois Application October 12, 1931, Serial No. 568,385

5 Claims. (Cl. 88—16)

This invention relates to a method of producing composite pictures in photography.

More particularly, the invention relates to a method of producing composite photographs embodying two or more component parts, which includes placing the component parts in superposed relation and illuminating them with lights with which they are respectively illuminable, and, by a single exposure, producing a composite picture.

The desirability of producing composite photographs is particularly marked in the motion picture art, but the invention herein described is not limited to this art alone but may be used generally in photography.

Broadly, two original scenes or components may be composed into a single picture by the use of film transparencies, one comprising a selected background and the other comprising a selected action, which are superposed and photographed, both components having their images rendered opaque to but reflective of light, the specific disclosure including a coating or like element, applied to the images, either manually, mechanically, chemically, photographically, optically or electrolytically, which imparts to the images the desirable characteristics of light opacity and reflectivity so that when both components are superposed and illuminated by reflection, a composite photograph may be produced.

In order to apprise those skilled in the art how to practice my invention, I shall now describe several preferred embodiments thereof in connection with the accompanying drawings which form a part hereof.

In the drawings:

Figure 1 illustrates one of the various ways of placing a treated foreground film adjacent to a treated background film, and controlling the illumination to permit photographing by a single exposure;

Fig. 2 is a similar illustration showing an alternative embodiment of the present invention;

Fig. 3 is a front elevation of a positive background scene, the film being that usually employed in photography and having its image made opaque to but reflective of light by the application of a coating over the entire film on one side;

Fig. 4 is a positive image of a film to be used as a foreground, the image having been made opaque to and reflective of light;

Fig. 5 is the same positive shown in Fig. 4, but looking at the opposite or emulsion side to show the opaque but light-reflective coating over the image;

Fig. 6 illustrates a finished positive composite picture carrying the images of the foreground and the background thereon as a complete picture; and Figs. 7, 8 and 9 illustrate additional alternative embodiments of the invention.

The components used may be the usual black and white diapositive, such as the ordinary cinema projecting film, or plates used in still photography, or they may be paintings, depending upon the characters or images to be combined and the superposing to be done.

When the extensively used present-day film is developed, the images are formed by the fixation of innumerable minute particles of metallic silver imbedded in the gelatin of the photographic emulsion, there being relatively more silver particles in the shadows than in the high-lights but somewhat uniformly distributed throughout the depth of the photographic emulsion.

The present invention is very well adapted to this type of photographic film, but it will be understood that the invention might well be applied to other film where the images are produced in a different manner or have different physical characteristics.

As shown in the drawings, the background may be scenery, or other objects in the form of a painting or photographic film, a positive print 10 of the background being shown in Fig. 3.

As a specific example, the foreground film 11 shown in Fig. 4 may also be a painting or the usual diapositive, such as the ordinary cinema projecting film, having the area 12 about the image 13 transparent, and the image 13 comprising the metallic silver imbedded in the photographic emulsion carried by the base of the film. The action or objects, of which foreground image 13 is composed, may be photographed in front of a white ground, so that, when a positive print is made from the negative, the area about the image will be transparent or relatively free from silver deposit.

While one of the features of the present invention resides in making the background image and the foreground image opaque to but reflective of light, it will be understood that the same results may be accomplished where these images are either inherently opaque to and reflective of light or have otherwise been previously treated to obtain one or both of these characteristics for any purpose whatsoever.

This step may be accomplished by applying a relatively opaque but light reflective coating 15 to foreground image 13 and by applying a similar coating 16 to the rear surface of background film 10. By the term "rear surface" I mean the surface that is away from and not facing lens 17 of camera 18. The effects produced by and shown as coatings 15 and 16 may be obtained on the images of the foreground and background components either manually, mechanically, optically, photographically, electrolyticaly or chemically, as disclosed and claimed in copending application Serial Number 365,568, filed May 23, 1929.

Fig. 5 illustrates the image 13 after it has been coated by opaque and light-reflective substance 15, and is a view looking at the emulsion side of the foreground film 11 to show that this coating 15 may be applied to the image upon the emulsion side 12, although not necessarily so, inasmuch as it may be applied to the base side 22 when the occasion may require. Opaque and light-reflective coating 16 may be applied to background component 10 in many different ways, as shown in Figs. 1, 2, 7, 8 and 9, and as will be later explained.

The next step in the method herein disclosed consists in placing both background component 10 and foreground component 11, after they have been treated, in superposed relation.

As illustrated in the drawings, background component 10 and foreground component 11 need not be in actual contact, but may be arranged in suitable position and in one focal plane of lens 17 of camera 18, while unexposed film 14 may be arranged in the other focal plane of lens 17. By proper lighting effects, these films may be illuminated so that they may be photographed by camera 18, or otherwise exposed to film 14, and a composite picture produced upon film 14, which, in this case, will be a negative. A positive print 20 of negative 14 is shown in Fig. 6 to illustrate that in the final composite picture produced the details of both components are clear and distinct and the details of the background do not interfere with the details of the foreground.

The particular step of illuminating films 10 and 11 may be varied from that shown in the drawings, but, as illustrated, it is preferred to use a light or lights 19 to illuminate the background component 10 and the foreground component 11 by reflected light. The illuminating light or lights 19 may be placed in any suitable position to secure the desired results. It is possible to space the components a suitable distance apart and employ separate illuminators for illuminating background component 10 and foreground component 11. If an arrangement is used, which is shown in the drawings, the rays of light from illuminators 19 will pass through the clear area 12 of foreground component 11, strike the image of background component 10 and be reflected back through this clear area 12 of film 11, except where the foreground image 13 appears thereon, thereby effecting illumination of the background component by reflection. Coating 15 serves to prevent the passage of reflected light from the background film 10 through the foreground image area, while the light reflective characteristic of coating 15 causes, in effect, a reflection of the rays of light from illuminators 19 so that the details of the foreground image 13 will appear clear and distinct in the composite picture of positive film 20.

Material 15, as well as material 16, may be of any desired kind, the purpose of these coatings being to render the image opaque to and reflective of light. They may be of any color, although I desire that coatings 15 and 16 may be somewhat light so as to be capable of reflecting light rays. On the other hand, coatings 15 and 16 need not be provided in the exact form shown in the drawings, because the same results can be obtained by chemical treatment of the images and proper lighting effects.

The particular relative arrangement of background component 10 and foreground component 11 may vary with respect to each other, but, in Fig. 1, the emulsion side 21 of film 11 is away from lens 17 and the celluloid side 22 of film 11 faces this lens. The emulsion sides of these two films may face each other, as shown in Figs. 1, 2, 7 and 9, but it will be apparent to one skilled in the art that this arrangement may vary somewhat.

As above stated, coating 16 may be applied to background component 10 in a number of different ways, as illustrated in Figs. 1, 2, 7, 8 and 9.

In Fig. 1, coating 16 is arranged in optical contact with the background image and as a substratum over the entire film between the celluloid base 24 and the emulsion 25. If the emulsion of background film 10 and the foreground film 11 face each other, as shown in Fig. 2, coating 16 may be applied over the entire area of the celluloid base 24 so that the background image is spaced from this opaque and light-reflective coating 16 by the celluloid base 24.

It will be understood that although I have described the present invention in connection with standard photographic film wherein the sensitive photographic material is carried upon a base, such as celluloid, any type of film may be used and a celluloid base is not essential. In Fig. 7 the emulsion 25 is shown carried upon a base of white material 26. This material may be of any suitable substance, such as paper, and may serve the same purpose as coating 16.

In Fig. 8 I have shown an arrangement embodying the application of coating 16 to the emulsion 25 of background component 10 so that the celluloid base 24 is arranged to face foreground component 11.

In Fig. 9 I have shown an arrangement of making the image of background film reflective of light without applying a coating 16. This is accomplished by developing somewhat deeply film 10, and then subjecting the film to a washing bath to remove the developing reagent. It might be found desirable to subject film 10 before washing to a stop bath in order to control the action of the developer. After film 10 is developed and washed, it is preferably not fixed so as to allow the undeveloped sensitive photographic material to remain, the density of this undeveloped sensitive photographic material varying to produce a varying reflectivity for light to effect correct reproduction of the background image when photographed upon film 14.

In the event the ordinary photographic film is used wherein the images are formed by fixation of innumerable minute particles of metallic silver imbedded in the gelatin comprising the photographic emulsion, the undeveloped sensitive photographic material may comprise an undeveloped silver salt, such as possibly a silver bromide of yellowish appearance. If so desired, a suitable de-sensitizer may be used to prevent darkening of the silver bromide by the action of light. This step fixes the silver bromide. If different films are used, it will be apparent that the light-reflective material remaining in the emulsion will be the equivalent and serve the same purpose. The broad concept of the present invention, with respect to this alternative embodiment of the invention, is intended to include such equivalent material, but I find that, specifically, the use of an undeveloped silver salt of light appearance or color produces remarkable results. The emulsion side 25 of background film 10, as shown in Fig. 9, may be arranged to face the emulsion side 21 of foreground film 11. The light rays of illuminators 19 striking the image on background film 11 will be reflected by the undeveloped photographic material, and consequently, the details of the background image will be accurately impressed upon film 14.

In the drawings, the photographic emulsion is shown considerably thicker in cross section than the celluloid base contrary to the actual proportions generally used in the ordinary photographic film; but it will be understood that this showing is made for the purpose of illustration only, that these proportions may vary, and that the proportions of the standard photographic film are also contemplated.

Other objects and advantages will be apparent to those skilled in the art, and therefore I do not wish to be limited to the exact details or steps described or shown herein, since many modifications are possible without departing from the spirit and scope of the invention.

I claim:

1. The method of producing a composite photograph embodying two or more component parts which includes making an image of one component, making a photographic silver deposit image of the other component surrounded by a transparent ground, treating the silver deposit image to make it substantially opaque to but reflective of light, providing a substantially opaque but light reflective backing for the image of the first component, superposing the images and illuminating them by reflected light, and exposing a fresh actinic surface to the superposed illuminated images.

2. The method of producing a composite photograph embodying two component parts which includes making film transparencies, each transparency having a photographic image of one of said components, providing opaque but light reflective backings for said images, superposing the two transparencies and illuminating the images by light with which they are respectively illuminable, and exposing a fresh actinic surface to both images so superposed and illuminated.

3. The method of producing a composite photograph embodying two component parts which includes making transparencies, each transparency having a photographic image of one of said components, providing one of the transparency images substantially opaque to but reflective of light, making the other transparency image substantially opaque to but reflective of light by providing an opaque but light reflective backing thereon, superposing the two transparencies, and illuminating the images by reflected light, and exposing a fresh actinic surface to both images.

4. The method of producing a composite photograph of two or more component parts which includes making transparencies, each transparency having a photographic image of one of said components, providing substantially opaque but light reflective backings for said images, superposing said transparencies and illuminating the images by reflected light, and exposing a fresh actinic surface to the images.

5. The method of producing a composite photograph embodying two or more component parts which includes making transparencies, each transparency having a photographic image of one of said components, chemically treating said images to provide opaque but light reflective backings for said images, superposing the transparencies and illuminating the images by reflected light, and exposing a fresh actinic surface to the images.

CONRAD G. BRIEL.